United States Patent

[11] 3,594,494

| [72] | Inventor | Ross J. Sullivan<br>Columbia, S.C. |
|---|---|---|
| [21] | Appl. No. | 860,537 |
| [22] | Filed | Sept. 24, 1969 |
| [45] | Patented | July 20, 1971 |
| [73] | Assignee | C/P Corporation<br>Columbia, S.C. |

[54] AN ASSEMBLAGE FOR SUPPORTING AN INSULATOR ON A SUPPORT ROD
21 Claims, 4 Drawing Figs.

[52] U.S. Cl. ............................................. 174/158 R,
174/149 R, 287/20 R, 174/209, 287/125
[51] Int. Cl. .................................................. H01b 17/14
[50] Field of Search ........................................... 174/45,
148, 149, 150, 158, 161, 163, 164, 165, 166, 168,
169, 176, 177, 178, 186, 188, 191, 192, 194, 195,
197, 198, 202, 209; 306/30; 287/20, 23, 125, 128;
248/188, 188.8, 188.9

[56] References Cited
UNITED STATES PATENTS

| 942,335 | 12/1909 | Mershon .................. | 174/148 |
| 3,272,463 | 9/1966 | Greig ........................ | 174/158 X |

FOREIGN PATENTS

| Add. 27143 | 1/1924 | France ................... | 174/150 |

*Primary Examiner*—Laramie E. Askin
*Attorney*—Kenyon and Kenyon

ABSTRACT: The support is constructed of a fitting which fits over the end of a glass fiber rod, a threaded member which extends out of the fitting to threadably receive an insulator and spring washers within the recess of the fitting which serve to urge the fitting against the insulator in a frictional locking relation. Upon threading the insulator against the fitting, the spring washers flatten so as to create the locking force between the insulator and fitting.

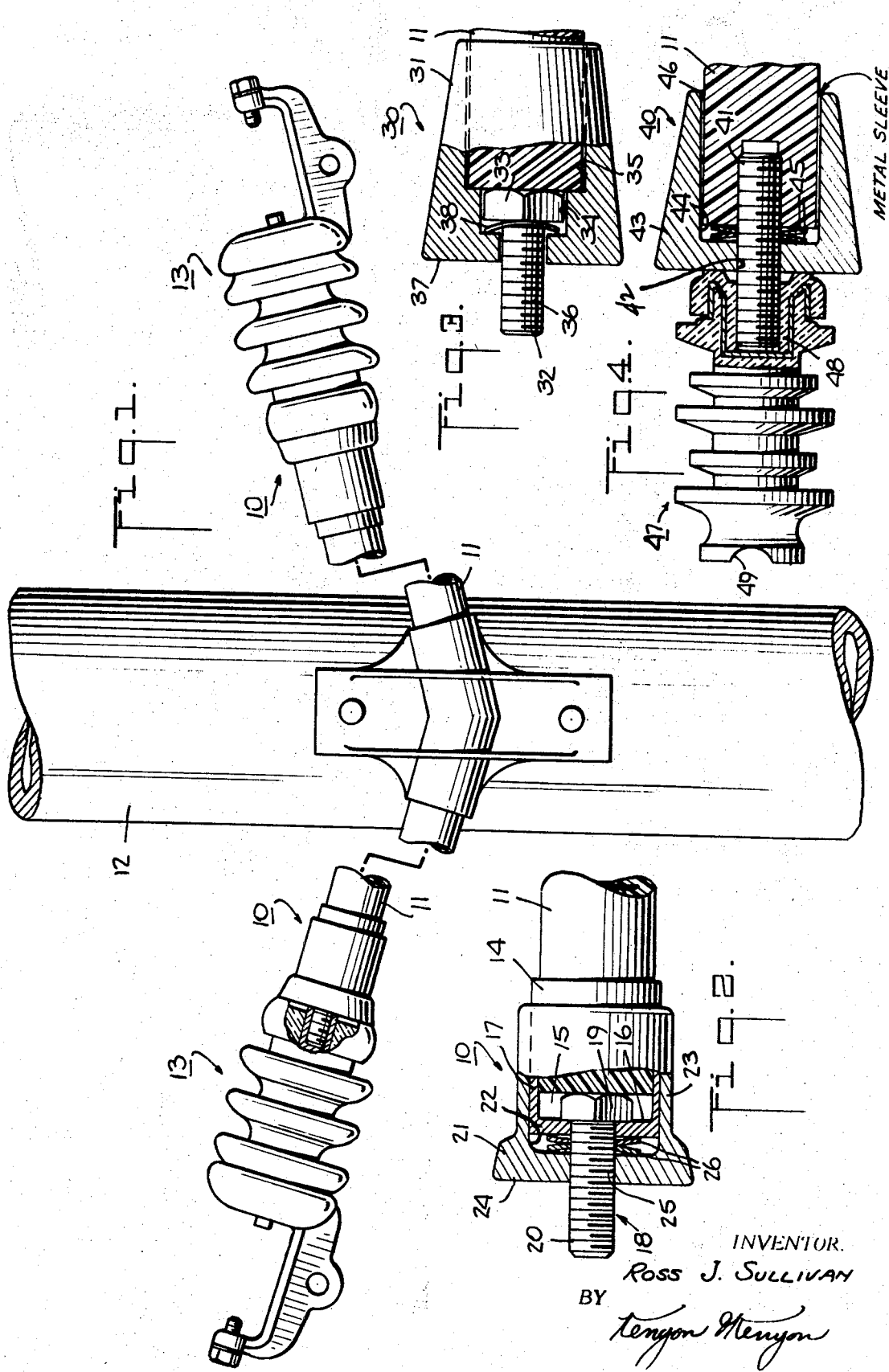

AN ASSEMBLAGE FOR SUPPORTING AN INSULATOR ON A SUPPORT ROD

This invention relates to a support for an insulator. More particularly, this invention relates to a support for securing insulators to the ends of glass fiber reinforced plastic support arms.

Heretofore, various insulators have been known for supporting electrical wires and cables such as transmission lines, telephone wires, and the like. For example, porcelain insulators having a metal base and metal top brackets for fastening of wire holding clamps or shoes have been known. Insulators have also been known in which slots are provided at the opposite end of a metal base for retaining a supported conductor which is held in place by suitable ties. Generally, these insulators have been supported on a transmission pole or a cross arm by a threaded bolt which passes through the pole or cross arm into a suitable tapped hole in the base of the insulator. The head of the bolt is usually on one side of the pole cross arm while the insulator is on the other side. This allows the metal top brackets or the slots to be oriented simply by loosening of the bolt, rotating the insulator to the proper rotational position, and retightening of the bolt.

However, due to the advent of fiberglass reinforced plastic pole line hardware, the various techniques heretofore used for mounting of the insulators have not been generally adaptable to this hardware. For example, in some cases, it has been suggested that a stud be glued or threaded into the end of a glass fiber reinforced rod which is to mount the porcelain insulator on a transmission pole, or made as part of the cap secured to the end of the rod. However, alignment of the insulator becomes questionable since the stud is generally nonrotatable for alignment or rotational orientation purposes.

Further, the various supports which have been utilized in the past have utilized components which have been susceptible to bending under the load, generally a cantilever load, transmitted through the insulator. In some instances, these bending loads have been detrimental to the mounting of the insulators as well as to the components which mount the insulators. Additionally, in some cases, the mountings of the insulators have been such as to permit the insulators to rock on the supports. Because of this, not only has the support been subjected to fatigue stresses but also the conductor which is supported on the insulator has been allowed to vibrate or whip along its length.

Accordingly, it is an object of the invention to provide a support for mounting of insulators to glass fiber reinforced plastic arms.

It is another object of the invention to provide a support which securely mounts an insulator thereon.

It is another object of the invention to prevent the rocking of an insulator on a support.

It is another object of the invention to permit the rotational orientation of an insulator in a simple manner on a transmission pole.

Briefly, the invention provides a support for supporting an insulator on a support arm rod in a rotationally adjustable manner. The support includes a fitting which has a recess for mounting over the end of the rod and a base for abutting the insulator to be mounted on the rod. In addition, the support has a threaded member which passes through the fitting and is received within the insulator such that the insulator can be threaded onto the threaded member against the base of the fitting. The support also has a resilient means within the fitting recess which urges the fitting and the insulator into a frictional locking relationship upon threading of the insulator against the fitting. The mounting of the insulator on the rod by this support is such that the insulator can be further rotated after abutting the fitting so as to orient the insulator with respect to a conductor wire at the end.

In one embodiment, the support has the fitting telescopically received over the end of the rod while the threaded member has a head which is trapped within a cup fixed to the end of the rod within the fitting and a threaded shank which threads through the fitting. In this embodiment, the insulator threads onto the threaded shank up against the fitting. Further, the resilient means which is formed by a pair of spring washers is disposed between the cap and the fitting so that upon tightening of the insulator on the fitting both the insulator and fitting can rotate with respect to the rod while the washers flatten and increase the locking force on the fitting with respect to the rod.

In another embodiment, the fitting is telescopically received over the end of the rod while the threaded member is threaded into the end of the rod as well as through the fitting. In this embodiment, the resilient means which is also in a form of a pair of spring washers are disposed between the end of the rod and the fitting such that the fitting and insulator can rotate with respect to the rod upon further rotation of the insulator for alignment purposes. Additionally, a sleeve can be provided circumferentially about the rod within the confines of the fitting to reinforce the rod against bending stresses transmitted through the fitting to the rod and to provide a bearing surface for the fitting.

In still another embodiment, the fitting is secured directly to the end of the rod while the threaded member passes in unthreaded relation through the fitting into the insulator. In this embodiment, the resilient means is in the form of a washer which is disposed between a head of the threaded member and the bottom of the recess in the fitting such that the threaded member rotates with the insulator against the force of the spring when the insulator is brought against the fitting.

The support of the invention permits the use of a glass fiber reinforced plastic rod as a support arm for an insulator and thus it becomes possible to handle higher voltages through the use of the longer insulated path of the support arm and consequent extension of the distance to the ground. In addition, the support permits the securement of the insulator in a manner such that rocking of the insulator with respect to the support is substantially eliminated while at the same time allowing the insulator to be rotationally oriented for proper alignment with a conductor.

These and other objects and advantages of the invention will become more apparent from the following detailed description and appended claims taken in conjunction with the accompanying drawings in which:

FIG. 1 illustrates a fragmentary view of a pair of insulators mounted on a pair of supports according to the invention;

FIG. 2 illustrates a cross-sectional view of a support of FIG. 1;

FIG. 3 illustrates a modified support according to the invention; and

FIG. 4 illustrates a further modified support according to the invention with an insulator mounted thereon.

Referring to FIG. 1, a pair of supports 10 are mounted on respective support arm rods 11, for example, glass fiber reinforced plastic rods, which, in turn, are supported, as is known, on a power pole 12. In addition, each support 10 mounts a porcelain insulator 13, for example, a clamp-type post insulator thereon.

Referring to FIG. 2, wherein only one of the identical supports 10 is shown, the conductor support 10 includes a cap 14 of cup-shaped contour and smooth surface which is fitted over the end of the support arm rod 11 and is secured thereto, for example, with an adhesive such as an epoxy-versamid. The cap 14 is positioned so as to be spaced from the end of the rod 11 so that a chamber 15 is formed between the end of the rod 11 and the bottom 16 of the cap 14. In addition, the cap 14 has a cylindrical wall 17 which extends along a length of a rod 11. A threaded member 18 is mounted between the cap 14 and the support arm rod 11 and includes a bolt-shaped head 19 which is retained within the chamber 15 between the rod 11 and the cap 14 in a tight fit manner so as to be restrained against rotation and a threaded section 20 which extends through the cap 14 in threaded relation coaxially of the end of the rod 11. In order to further ensure securement of the member 18 against rotation, some adhesive or a small spot weld can be used to fix the member 18 to the cap 14.

In addition, a cup shaped fitting 21 having a recess 22 is telescoped over the cap 14. This fitting 21 has a cylindrical wall 23 which surrounds the cap 14 in close fitting slidable relationship as well as a flat base 24 which is disposed to the opposite side of the recess 22. The threaded section of the threaded member 18 is threaded through a threaded bore 25 within the base 24 of the fitting 21 such that the fitting 21 is adjustably mounted on the threaded member 18. Also, a resilient means such as a pair of spring washers 26, for example, Belleville washers, are disposed about the threaded section 20 of the bolt 18 coaxially of the rod axis between the cap 14 and the fitting 21. The washers 26 are sized such that in a free unrestrained state, a substantial portion of the threaded section 20 of the bolt 18 passes through the fitting 21 to receive an insulator 13 thereon.

In use, with the cap 14 secured to the rod 11 and the fitting 21 threaded onto the intermediate part of the threaded section 20 against the washers 26, an insulator 13 is threaded onto the section 20 and brought up against the base 24 of the fitting 21. Thereafter, the insulator 13 is further rotated so as to become frictionally locked against the base 24 of the fitting 21. This locking fit is effected in a locknut relationship between the fitting 21 and the insulator 13 on the threaded section 20. In the event that the insulator 13 requires further rotation for orientation purposes, the insulator 13 is further rotated along with the fitting 21. During this time, the washers 26 begin to flatten and thus urge the fitting 21 away from the pole 11 with increasing force.

In order to retain the fitting 21 and thus the insulator 13 against rotation with respect to the rod 11, the fitting 21 is initially threaded on the bolt 18 up against the washers 26 such that the washers 26 are slightly flattened between the fitting 21 and the cap 14. This causes a frictional lock between the cap 14, threaded member 18 and fitting 21 such that the fitting 21 is restrained against rotation relative to the rod 11. Consequently, after the insulator 13 has been locked against the fitting 21 any further rotation of the insulator causes further flattening of the washers and thus an increase in the friction forces effecting the lock.

Referring to FIG. 3, the support 30 can alternatively be constructed with a fitting 31 which is secured directly to the rod 11, for example, by an adhesive as above, and has a tapered outer surface. In this instance, the threaded member or bolt 32 has a head 33 which is retained within a recessed counterbore 34 of the recess 35 in the fitting 31 and a threaded section 36 which extends through the flat base 37 of the fitting 31 in unthreaded relation. In order to secure the bolt 32 against rotation relative to the fitting 31, the counterbore 34 is provided with a contoured cross section, e.g. of polygonal shape, to mate with the head 33 and hold the head 33 against rotation. In addition, a resilient means, in the form of a single-spring washer 38 is disposed between the head 33 of the bolt 32 and the base 37 of the fitting 31.

In use, an insulator is threaded onto the bolt 32 and brought up against the flat base 37 of the fitting 31. Thereafter, in order to tighten the insulator with respect to the fitting 31, the insulator is further rotated so as to cause a flattening out i.e. compression of the washer 38 within the fitting 31. The insulator thus becomes frictionally locked against the base 37 of the fitting 31. Should rotational orientation of the insulator be required such can be accomplished by further rotation of the insulator with the consequent further flattening of the washer 38 between the fitting 31 and rod 11.

Referring to FIG. 4, the support 40 can also be constructed with a threaded member 41 which is threaded into the rod 11 itself. In this instance, the support 40 has a threaded member 41 which is threadably mounted in the end of a support rod arm 11 and which extends through a threaded bore 42 of a fitting 43 in threaded relation. The fitting 43 further is cup shaped to define a recess 44 for receiving the rod 11 and has a tapered outer surface. Additionally, a pair of spring washers 45 are disposed between the end of the rod 11 and the bottom of the recess 44 within the fitting 43 while a sleeve 46, for example, of metal, is secured about the support arm rod 11 concentrically within the recess 44 of the fitting 43. The sleeve 46 which can be fastened to the rod 11 by an adhesive serves as a ferrule type of reinforcement for the end of the rod 11 to reduce any tendency to split due to bending action of the threaded member 41 as well as a bearing surface for the fitting 43 so that any movement or vibration of the fitting 43 will not cause abrasion of the rod 11. In this instance, as in FIG. 2, the fitting 43 is adjustably mounted on the threaded member 41 with respect to the rod 11.

In use, the fitting 43 is initially threaded onto the threaded member 41 against the spring washers 45 so as to slightly flatten the washers 45 such that the fitting 43 is retained in a substantially secure manner with respect to the rod 11 over the sleeve 46. An insulator 47 having an internally threaded bushing 48 therein is then threaded onto the exposed threaded section of the threaded member 41 against the face of the fitting 43. Continued rotation of the insulator 47 causes the insulator 47 to become frictionally locked with respect to the fitting 43. Should rotational orientation of the insulator 47 be necessary in order to align the conductor receiving slot 49 at the free end of the insulator 47 with the rod 11, the insulator 47 together with the fitting 43 is further rotated on the threaded member 41 as the washers 45 become further flattened.

The invention thus provides a support which permits various types of insulators to be mounted on glass fiber reinforced plastic support rods. For example, insulators of the clamp top post type, such as shown in FIG. 1, tie top post insulators, as shown in FIG. 4, or pin-type insulators, can be easily and quickly mounted and oriented on the support. Further, the insulators can be securely mounted in place since the entire bearing surface of the insulators is in contact with the base of the fitting of the various embodiments described above. In addition, since the spring washers are retained in the fittings there is no contact between the spring washers and the insulators such that the area of support is substantially increased. Furthermore, the threaded member of the support is not susceptible to bending under the loads normally applied on the insulators through the fittings to the rod. In this latter instance, the cap or sleeve, which are made of metal, of the embodiments described in FIGS. 2 and 4, respectively, serve to further distribute the load from the fitting periphery to the rod so as to avoid any localized stresses on the rod.

The support of the invention further provides a secure means for fixing an insulator to a support arm rod. As described above, any rotation of the insulator with respect to the arm rod after being secured in place is subjected to increasing resistance by the various resilient and locking means described.

It is also noted that the telescopic portion of the fitting which fits around the rod prevents the fitting from rocking on the threads and threaded member and aids in holding the base against which the insulator abuts in a more secure perpendicular position with respect to the axis of the threaded member. The fitting also provides a firm flat surface against which the insulator seats and provides a more solid support for the insulator. In this way, the load on the insulators can be greater than otherwise without failure of the support.

What I claim is:

1. An assemblage for supporting an insulator on a support rod comprising a cup-shaped fitting having a recess for receiving a rod therein, a wall extending about said recess and a base for abutting an insulator;

a threaded member threaded into threaded engagement with said fitting and extending coaxially from within said recess out of said fitting to the opposite side of said recess for receiving an insulator thereon on said opposite side, and resilient means including at least one spring washer within said recess for urging said fitting away from a received rod in said recess upon flattening of said spring washer during threading of a received insulator against said base.

2. An assemblage as set forth in claim 1 which further comprises a cup-shaped cap disposed in said recess of said fitting and said threaded member includes a head retained within said cap and a threaded shank passing through said cap in threaded engagement with said fitting.

3. An assemblage as set forth in claim 2 wherein said resilient means is disposed between said cap and said fitting in parallel with said threaded shank.

4. An assemblage as set forth in claim 1 wherein said resilient means includes a pair of spring washers coaxially mounted about said threaded member.

5. An assemblage as set forth in claim 1 wherein said threaded member is adjustably mounted in said fitting.

6. An assemblage as set forth in claim 1 wherein said threaded member includes a head retained within said recess and said resilient means is disposed between said head and said fitting.

7. In combination
   a support arm rod,
   a fitting having a recess receiving an end of said rod therein and a base on the opposite side of said recess,
   a member having a threaded section extending from said recess through said base,
   an insulator threadably mounted on said threaded section in contact with said base, and
   a resilient means within said recess urging said insulator and fitting into frictional locking engagement.

8. The combination as set forth in claim 7 wherein said fitting is fixedly secured to said end of said rod.

9. The combination as set forth in claim 8 wherein said member includes a head retained in said recess between said rod and said fitting and said threaded section passes through said base.

10. The combination as set forth in claim 7 which further comprises a cup-shaped cap secured to said end of said rod and wherein said member includes a head retained within said cup between said rod and said cap.

11. The combination as set forth in claim 10 wherein said fitting is movably mounted over said cap and said threaded section is threaded through said fitting.

12. The combination as set forth in claim 11 wherein said resilient means is positioned between said cap and said fitting to urge said fitting away from said cap.

13. The combination as set forth in claim 11 wherein said resilient means is a pair of spring washers disposed about said threaded section.

14. The combination as set forth in claim 7 wherein said member is threaded into said end of said rod and said resilient means is disposed between said rod and said fitting.

15. The combination as set forth in claim 14 which further comprises a sleeve fixed to said rod, and said fitting includes a cylindrical portion telescopically mounted about said sleeve in movable relation thereto.

16. The combination as set forth in claim 7 wherein said fitting is cup shaped.

17. The combination as set forth in claim 7 which further comprises an internally threaded bushing in said rod threadably mounted on said threaded section of said member.

18. The combination as set forth in claim 7 wherein said threaded section is coaxial of said rod.

19. The combination as set forth in claim 7 wherein said rod is made of fiber glass reinforced plastic.

20. An assemblage for supporting an insulator on a support rod comprising
   a fitting having a recess for receiving a rod therein and a base for abutting an insulator;
   a cap slidably disposed within said recess of said fitting;
   a threaded member having a head within said cap and a threaded shank passing through said cap and threaded through said base of said fitting; and
   resilient means between said cap and said fitting for urging said cap and said fitting away from each other.

21. An assemblage for supporting an insulator on a support rod comprising
   a fitting having a recess for receiving a rod therein and a base for abutting an insulator;
   a threaded member threaded into said fitting having one threaded end within said recess for receiving a rod thereon in threaded engagement and a second threaded end extending from said base for receiving an insulator thereon in threaded engagement; and
   resilient means within said recess disposed about said threaded member.